INVENTOR.
FRANK D. JONES

May 4, 1943.　　F. D. JONES　　2,318,229
WINDROW PICKUP PRESS
Filed Aug. 23, 1939　　3 Sheets-Sheet 3

INVENTOR.
FRANK D. JONES
ATTORNEYS

Patented May 4, 1943

2,318,229

UNITED STATES PATENT OFFICE 2,318,229

WINDROW PICKUP PRESS

Frank D. Jones, Ottumwa, Iowa, assignor to Dain Manufacturing Company of Iowa, Ottumwa, Iowa, a corporation of Iowa Application August 23, 1939, Serial No. 291,532

9 Claims. (Cl. 100—25)

The present invention relates to windrow pick-up presses of the type comprising a baler and pick-up mechanism adapted to pick up a windrow of hay or other crop as the implement is driven across the field and to elevate the material to the hay press or baler where it is baled in the usual manner.

The principal object of the present invention is to provide an improved windrow pick-up press embodying a novel arrangement of the pick-up and baling mechanisms whereby the number of operating parts is reduced to a minimum with a corresponding decrease in the size and weight of the implement.

Another object is to provide a tractor-mounted windrow pick-up press having an improved draft connection between the implement and the propelling tractor which affords a considerable degree of flexibility therebetween, allowing the pick-up to accommodate itself freely to irregularities in the ground surface independent of the tractor.

A further object of this invention is to provide a tractor-mounted windrow pick-up press in which the baling or hay press mechanism is driven from the power take-off shaft of the tractor and the pick-up mechanism is driven from one of the supporting wheels on the implement.

These and other objects and advantages will become apparent from the following description of the preferred embodiment of the invention taken in connection with the accompanying drawings, in which Figure 1 is a top plan view of a tractor-mounted windrow pick-up press embodying the principles of my invention;

Figure 1:
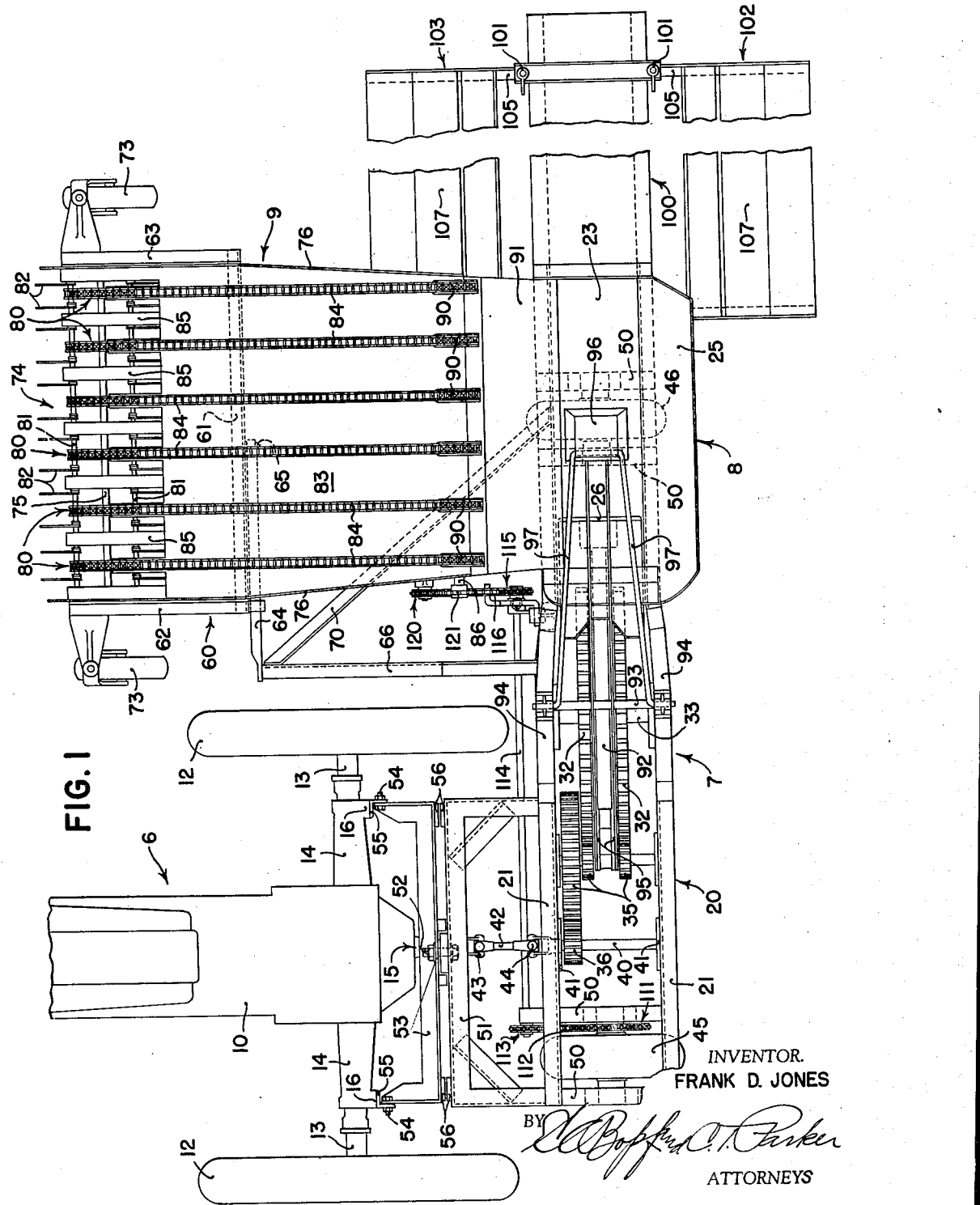

Referring now to the drawings, my improved windrow pick-up press is mounted on the rear end of a tractor 6 and comprises a transversely disposed baler or hay press indicated in its entirety by the reference numeral 7, extending laterally outward to the right of the tractor and having a baling chamber 8. A pick-up 9 extends downwardly and forwardly from the hopper of the baling chamber 8 to within close proximity of the ground alongside the tractor whereby the pick-up is enabled to gather the hay or other crop in the windrow and elevate the same to the baling chamber.

The tractor 6 is of a conventional type having a body 10 supported at its front end on a dirigible truck 11 and at its rear end on a pair of driving wheels 12 mounted on axles 13 journaled in rear axle housings 14. A power take-off shaft, indicated at 15, projects rearwardly from the differential housing of the tractor and is driven from the tractor engine. Rearwardly facing mounting bosses 16 are formed integral with the axle housings 14 near the outer ends thereof and provide the means for attaching the implement to the tractor, as will be described shortly.

Except for its unique transverse arrangement behind the tractor 6, the baler 7 is of more or less conventional construction and comprises a frame 20 having upper and lower angle members 21 and 22, respectively, suitably connected together in the usual manner. The baling chamber 8 has a bottom 23 with front and rear walls 24 and 25, respectively, fixed to the angle members 21, 22 to form a chamber, open at the ends and top, in which the hay received from the pick-up 9 is compressed into bales by a plunger 26. The plunger 26 is reciprocated by a pitman 30 which is journaled on a crank pin 31 fixed to and extending between a pair of axially spaced bull gears 32. The bull gears 32 have axles 33 journaled in suitable bearing means 34 fixed to the angle members 21, 22, and are driven through the usual counter gears 35 from a driving gear 36 mounted on a longitudinally extending shaft 40 which is journaled in bearing members 41 fixed to the front and rear sides of the frame 20. The front end of the shaft 40 is operatively connected with the power take-off shaft 15 by a telescopic drive shaft 42 and universal joints 43, 44.

The baler frame 20 is supported on a pair of laterally spaced wheels 45 and 46, each of said wheels being disposed between and journaled on suitable bearings carried by a pair of spaced triangular bracket members 50 fixed to the lower frame members 22. The baler 7 is flexibly connected with the tractor 6 by draft means comprising a forwardly extending U-shaped frame 51 made up of angle irons suitably braced and rigidly fixed to the front lower frame member 22. A longitudinally extending pivot bolt 52 connects the frame 51 at its mid-point with a U-shaped member 53, the arms of which extend forwardly and are pivotally connected by transversely aligned pivots 54 with vertical angle bars 55 which are rigidly fixed to the mounting bosses 16 on the backs of the rear axle housings 14. Bumpers 56 are fixed to adjacent ends of the draft members 51 and 53 and maintain the baler generally perpendicular to the line of advance, while allowing free vertical swinging movement about the transverse axis of bolts 54—54 and the longitudinal axis of bolt 52.

The pick-up 9 is generally similar to that shown and described in my co-pending application, Serial No. 95,142, filed August 10, 1936, and issued May 13, 1941, as Patent No. 2,242,077, to which reference may be had for details of construction and operation. Briefly, the pick-up 9 includes a supporting frame 60 consisting of a transverse bar 61 and a pair of longitudinally extending side bars 62 and 63 to which the transverse bar is secured. The supporting frame 60 is connected with the baler frame 20 by a frame comprising a transverse bar 64 pivotally connected at its laterally outer end, as shown at 65, to the center of the transverse angle bar 61 of the pick-up device. A fore and aft extending pusher bar 66 braced by a diagonal member 70 connects the bar 64 with the baler frame. With this construction, the pivot point 65 between the pick-up device and the push bar 64 permits the pick-up device to tilt about a longitudinal axis with respect to the hay press in following the contour of the ground surface.

The pick-up device extends upwardly and rearwardly and also forwardly and downwardly from the push bar frame 64—70 and is supported at its forward end on a pair of caster wheels 73, one of which is positioned at each side of the pick-up frame. A rotating pick-up cylinder, indicated in its entirety by the reference numeral 74 includes a supporting shaft 75 journaled in suitable bearings carried at the lower end of side members 76. A plurality of drum flanges 80 are mounted on the shaft 75 in spaced relation thereacross and carry cylinder tooth bars 81 in a manner described in detail in my aforesaid co-pending application. The usual plurality of laterally spaced spring pick-up teeth 82 are carried on the several tooth bars 81, and their spring action permits them to yield readily when they strike stones or other obstructions in the field.

The pick-up device is provided with the usual deck plate 83 which connects the side members 76 and provides an inclined surface on which the hay is moved by conveyor chains 84. The usual strippers 85 are provided at the lower end of the deck plate, and these serve to strip the hay from the pick-up teeth 82 as the cylinder 74 rotates.

Figure 2:
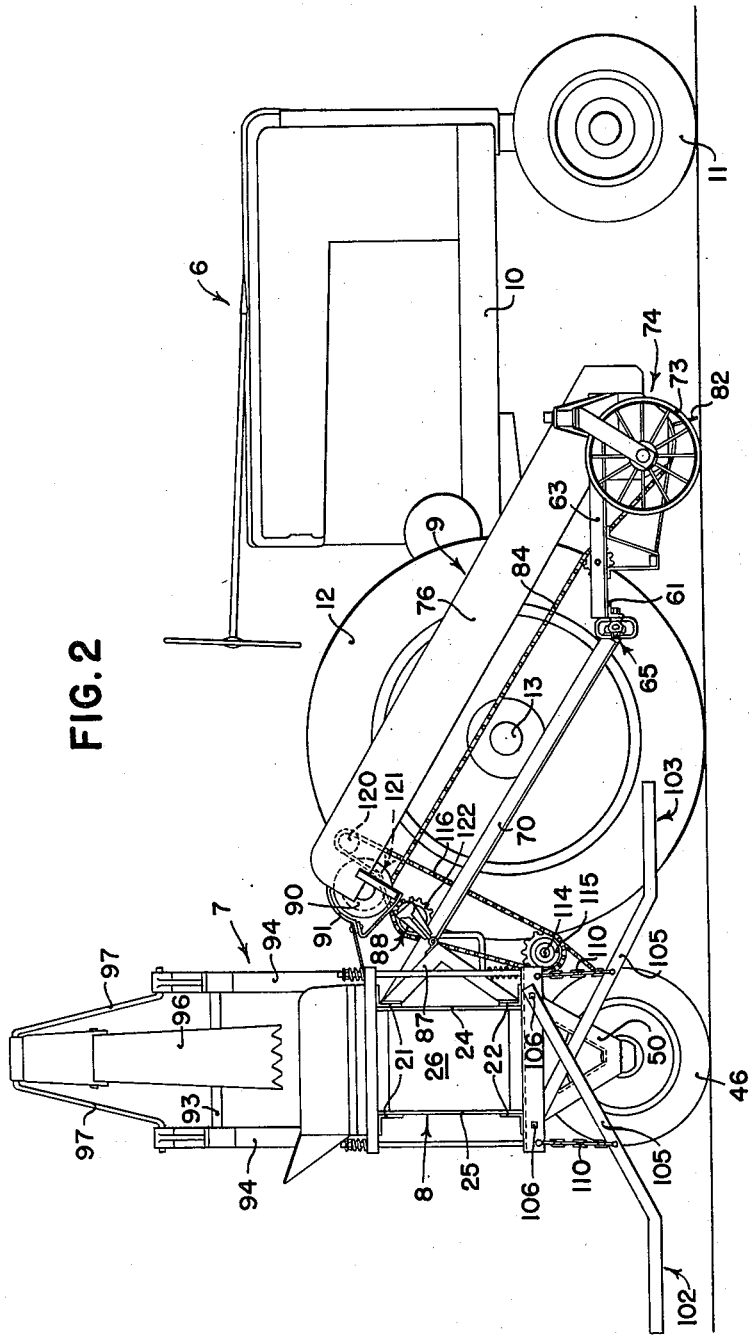
Figure 2 is a side elevation of the same.

The upper end of the pick-up conveyor is disposed slightly above and ahead of the top opening in the baling chamber 8, and a transverse shaft 86 having a plurality of flanged sprockets 90 mounted thereon is journaled in suitable bearings secured to the side plates 76. The sprockets 90 are positioned in alignment with the drum flanges 80, and the upper ends of the conveyor chains are trained over them. The upper portion of the pick-up device 9 is supported on a mounting bracket 87 which is fixed to the front angle bars 21, 22 of the baler frame 20 as best shown in Figure 2, and is connected therewith by means of a ball and socket connection indicated as an entirety by the reference numeral 88. This ball and socket connection is fully described in my aforementioned co-pending application, to which reference may be had, and accordingly it is not deemed necessary to describe it in more detail here inasmuch as it forms no part of the present invention.

A curved apron 91 conveys the hay or other material by gravity from the upper end of the deck plate 83 into a hopper defined between the outwardly flared side walls of the baling chamber 8, and the material is packed down into the chamber by means of a feeder arm 92 which is pivoted at 93 upon brackets 94 extending upwardly from the baler frame. A link 95 connects the feeder arm with the previously mentioned crank pin 31 on the bull gears 32. Depending from the other end of the feeder arm 92 is a feeding head 96, the position of which, relative to the arm 92, is controlled by a link 97.

Figure 3:
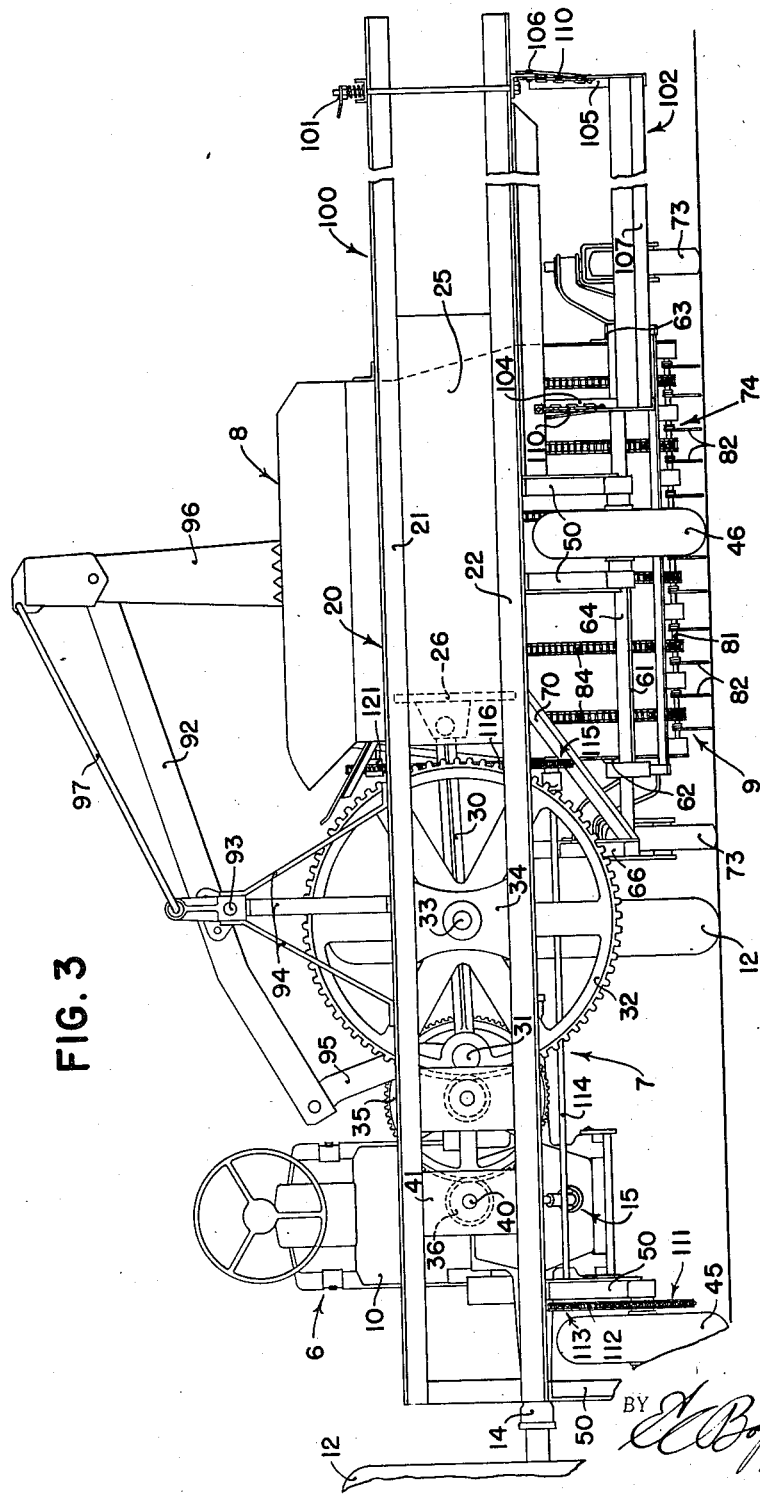
Figure 3 is a rear elevational view of my improved windrow pick-up press.

The bales of hay are pushed out of the right end of the baling chamber 8 (as viewed in Figure 3) by the plunger 26 in the operation of pressing the bales, and these bales travel along a bale case, indicated generally by the reference numeral 100, formed by the frame members 21, 22. The outer end of the bale case carries tensioning devices 101 of more or less conventional construction connecting the angle bars 21 and 22 and having adjustments for increasing or decreasing the size of the bales.

Suitable platforms or footboards 102 and 103 are provided along the front and back sides of the baler case 100 to provide a place for the operator who ties the bales. Each of the footboards comprises two supporting members 104 and 105 disposed adjacent the inner and outer ends of the bale case 100 and pivotally connected at 106 to the baler frame. Flooring 107 is secured to the members 104, 105 in any suitable way and provides a platform on which the operator stands during the operation of the machine. The footboards 102 and 103 are maintained in a level position by means of chains 110 which are secured to the baler frame 20 and to the supporting members 104, 105.

Power for driving the endless conveyor of the pick-up device is taken from the left supporting wheel 45 to which a sprocket 111 is fixed in any suitable manner. A driving chain 112 is trained around the sprocket 111 and around a second sprocket 113 fixed on one end of a shaft 114 which in turn is rotatably supported on suitable bearings mounted on the baler frame 20. Another sprocket 115 is fixed on the other end of the shaft 114, and a chain 116 is trained around it and around sprockets 120, 121 and 122 journaled on the pick-up 9. Sprocket 121 is fixed to the end of the upper conveyor shaft 86, and is engaged by the back side of the chain 116 as shown in Figure 2 so as to secure the proper direction of rotation for the conveyor shaft,—sprockets 120 and 122 serving to hold the chain 116 in driving engagement with the sprocket 121.

The operation of the windrow pick-up press is as follows: The machine is propelled across the field by the tractor 6 with the pick-up 9 straddling a windrow of hay or other crop. The pick-up conveyor is driven from the left supporting wheel 45 as the implement travels forwardly, and picks the hay up from the ground, elevating it along the deck sheet 83 by means of the conveyor chains 84 and discharging it into the hopper of the baling chamber 8. The hay is packed down into the baling chamber by the feeder head 96 and after the operator riding on one of the platforms 107 has inserted a division block, the hay is pressed into bales by the plunger 26; both feeder arm and plunger being driven from the power take-off shaft of the tractor. The bales move along the bale case 100 where they are tied by the operator riding on the platform 107 before being discharged onto the ground.

One of the advantageous features of this construction over the conventional windrow pick-up press having a longitudinally trailing hay press resides in the fact that the usual cross conveyor employed to carry the hay from the top of the pick-up over to the baling chamber hopper, is eliminated together with all of its driving mechanism. In the present invention the baling chamber hopper is located directly below and to the rear of the pick-up 9, and receives the hay directly from the pick-up mechanism without further handling.

While I have shown and described above the preferred structure in which the principles of the present invention have been embodied, it is to be understood that my invention is not to be limited to the specific details shown and described, but that, in fact, widely different means may be employed in the broader aspects of my invention.

What I claim, therefore, and desire to secure by Letters Patent is:

1. In combination with a tractor, an implement comprising a hay press mounted on the rear of the tractor transverse to the direction of forward travel, said hay press having a baling chamber disposed to one side of the tractor, a pick-up device including conveying mechanism extending forwardly from said baling chamber alongside the tractor and adapted to discharge material thereinto, the front end of said pick-up device being positioned intermediate the front and rear ends of the tractor, and mechanism mounted on the hay press directly behind said tractor and driven from the tractor engine for compressing the material within said baling chamber into bales.

2. In combination with a tractor having a rearwardly extending power take-off shaft, a transversely extending frame disposed to the rear of the tractor and projecting laterally to one side thereof, draft means connecting said frame with the tractor providing for swinging movement of the frame relative to the tractor about a fore and aft extending axis and preventing relative swinging movement about a vertical axis, a baling chamber carried on the laterally projecting portion of said frame, pick-up mechanism extending forwardly from said baling chamber for gathering up windrows and discharging the material into the baling chamber, mechanism carried on said frame substantially directly behind the tractor for compressing the material in the baling chamber into bales and ejecting the same from the baling chamber to the side away from the tractor, and driving connection between said power take-off shaft and said mechanism.

3. In combination with a tractor having a power take-off shaft extending rearwardly from the back end thereof, a windrow pick-up press comprising a transversely arranged, wheel supported frame disposed closely to the rear of said tractor and extending laterally to one side thereof, draft means connecting said frame with the tractor for maintaining the frame in transverse relation to the tractor, a baling chamber mounted on said frame to one side of the tractor, a pick-up device comprising means for gathering up a windrow as the implement travels forwardly and conveying the material to said baling chamber, a baler case extending laterally from said baling chamber in the direction away from the tractor, hay press mechanism mounted on said frame directly behind the tractor closely adjacent said power take-off shaft and operatively connected therewith for compressing the accumulated material in said baling chamber into bales by forcing the same outwardly along said laterally extending baler case, said bales being discharged upon the ground on the side of the windrow pick-up press opposite the tractor, and a platform carried on said frame along one side of said baler case to support an operator tying the bales.

4. In combination with a tractor having a rearwardly extending power take-off shaft, a windrow pick-up press comprising a transversely arranged wheel supported frame disposed to the rear of said tractor and extending laterally to one side thereof, draft means for connecting said frame to the tractor to maintain the frame in transverse position, a pick-up device spaced laterally from said draft means and extending forwardly from said frame alongside said tractor, a transversely disposed baling chamber mounted on said frame to the rear of said pick-up device and substantially in line therewith, said pick-up device conveying the gathered-up material to said baling chamber, hay press mechanism including a plunger supported on the frame for transverse reciprocatory movement for compressing the material within the baling chamber into bales and ejecting the bales laterally from the baling chamber on the side opposite said tractor, a driving member journaled on said frame substantially in fore and aft alignment with the power take-off shaft, means operatively connecting said driving member with said plunger for reciprocating the latter, and driving connection between said driving member and said power take-off shaft.

5. In combination with a tractor, an implement frame mounted on the rear of the tractor and extending laterally to one side thereof, a crop receiving chamber carried on said laterally extending portion of the frame, a pick-up device extending forwardly from said chamber alongside the tractor, the front end of said pick-up device being positioned ahead of the rear wheels of the tractor, and crop treating mechanism mounted on said frame directly behind said tractor transverse to the direction of forward travel, said mechanism being operative to treat the crop collected in said receiving chamber and to move said crop laterally out of the chamber.

6. In combination with a tractor, a windrow pick-up press comprising a frame disposed transverse to the direction of forward travel and extending laterally to one side of the tractor, a baling chamber mounted on said frame and spaced laterally from the tractor, a pick-up device extending downwardly from the baling chamber substantially parallel to the direction of forward travel, mechanism mounted on said frame for compressing the material in the baling chamber into bales, a supporting wheel journaled on said frame, said wheel being spaced laterally from the longitudinal center line of the tractor on the other side of said center line from the baling chamber, and power transmitting means connecting said supporting wheel with said pick-up mechanism for driving the latter, whereby the side draft of said supporting wheel on one side of the longitudinal center line of the tractor counterbalances a portion of the side draft of the implement on the other side of said center line.

7. In combination with a tractor, a windrow pick-up press comprising a frame disposed transverse to the direction of forward travel and extending laterally to one side of the tractor, a baling chamber mounted on said frame and spaced laterally from the tractor, a pick-up device extending downwardly from the baling chamber substantially parallel to the direction of forward travel, mechanism mounted on said frame for compressing the material in the baling chamber into bales, a pair of laterally spaced supporting wheels journaled on said frame, one of said wheels being positioned substantially beneath said baling chamber and the other wheel being spaced laterally from the longitudinal center line of the tractor in the direction opposite the baling chamber, and power transmitting means connecting said other supporting wheel with said pick-up mechanism for driving the latter, whereby the side draft of said other supporting wheel counterbalances a portion of the side draft of the implement on the opposite side of the center line of the tractor.

8. In combination with a tractor, an implement comprising a hay press mounted on the rear of the tractor transverse to the direction of forward travel, said hay press having a generally rectangular baling chamber disposed to one side of the tractor, a plunger reciprocatively disposed within said chamber, a gear actuated pitman at one end of said baling chamber for reciprocating said plunger to compress the material within said baling chamber, the opposite end of said chamber having a discharge opening for finished bales, a pick-up device including conveying mechanism extending forwardly alongside the tractor from said baling chamber intermediate said plunger and said discharge opening and adapted to discharge material into said chamber, the front end of said pick-up device being positioned intermediate the front and ear ends of the tractor, and power transmitting mechanism mounted on the hay press directly behind said tractor for driving said gear actuated pitman from the tractor engine.

9. In combination with a tractor, a hay press comprising a generally rectangular baling chamber disposed transversely behind said tractor and extending laterally to one side thereof, draft means connecting said hay press in close coupled relation to said tractor providing for vertical swinging movement of said baling chamber relative to the tractor about a fore and aft extending axis and preventing relative swinging movement about a vertical axis, ground engaging wheel means supporting said baling chamber, a plunger reciprocatively disposed within said chamber, a gear actuated pitman at one end of said baling chamber for reciprocating said plunger to compress the material within said baling chamber, the opposite end of said chamber having a discharge opening for finished bales, a pick-up device including conveying mechanism extending forwardly alongside the tractor from said baling chamber intermediate said plunger and said discharge opening and adapted to discharge material into said chamber, the front end of said pick-up device being positioned intermediate the front and rear ends of the tractor, and power transmitting mechanism mounted on the hay press directly behind said tractor for driving said gear actuated pitman from the tractor engine.

FRANK D. JONES.